UNITED STATES PATENT OFFICE.

FRITZ HOFMANN AND JÜRGEN CALLSEN, OF ELBERFELD, GERMANY, ASSIGNORS TO FARBENFABRIKEN OF ELBERFELD CO., OF NEW YORK, N. Y., A CORPORATION OF NEW YORK.

GLYCOLIC MENTHYL ESTER.

SPECIFICATION forming part of Letters Patent No. 707,110, dated August 19, 1902.

Application filed April 29, 1902. Serial No. 105,209. (Specimens.)

*To all whom it may concern:*

Be it known that we, FRITZ HOFMANN and JÜRGEN CALLSEN, doctors of philosophy, chemists, residing at Elberfeld, Germany, (assignors to the FARBENFABRIKEN OF ELBERFELD COMPANY, of New York,) have invented a new and useful Improvement in Glycolic Menthyl Esters, of which the following is a specification.

Our invention relates to the preparation of a new pharmaceutical product, which is chemically the ester of menthol and glycolic acid, the glycolic menthyl ester of the formula:

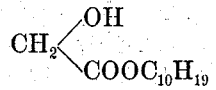

and which according to our researches possesses valuable therapeutic properties, an average dose being between 0.5 and two grams.

The process for producing our new compound consists in treating menthol or derivatives thereof with glycolic acid or derivatives thereof in any manner suitable for the method of esterification. The new glycolic menthyl ester thus produced represents white lustrous needles melting at 87° centigrade. It is only sparingly soluble in water and readily soluble in most organic solvents. By the action of caustic alkalies or alkaline carbonates it is split up into menthol and glycolic acid.

The following examples will serve to illustrate the manner in which our invention can be carried into practical effect. The parts are by weight:

Example I: 7.6 parts of glycolic acid and 15.6 parts of menthol are heated for about six hours at about 175° centigrade. Subsequently the reaction mass is distilled *in vacuo* and the distillation product is purified by a recrystillization from ligroin and then from alcohol. It has the above-given properties.

Example II: A mixture of 5.8 parts of polyglycolide $(C_2H_2O_2)x$ and 15.6 parts of menthol is heated at about 200° centigrade for from eight to ten hours. The reaction mass is then further treated as described in Example I.

Example III: Into a mixture of 5.7 parts of the nitrile of glycolic acid,

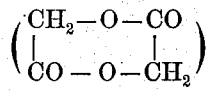

15.6 parts of menthol, and 1.8 parts of water hydrochloric-acid gas is introduced for some hours while stirring. During this time the temperature is kept at about 90° centigrade. The glycolic menthyl ester thus produced is then isolated and purified in the manner described in Example I.

The new ester can also be prepared by heating with menthol glycolic anhydrid glycolide,

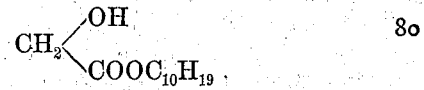

glycolic ethyl ester or the like, or by heating a salt of glycolic acid, such as silver glycolate, with menthyl iodid or the like.

Having now described our invention and in what manner the same is to be performed, what we claim as new, and desire to secure by Letters Patent, is—

The herein-described new glycolic menthyl ester having the formula

representing white lustrous needles melting at 87° centigrade, which are only sparingly soluble in water and readily soluble in most organic solvents, being split up into menthol and glycolic acid when reacted upon by caustic alkalies or alkaline carbonates and exhibiting valuable therapeutic properties, substantially as hereinbefore described.

In testimony whereof we have signed our names in the presence of two subscribing witnesses.

FRITZ HOFMANN.
JÜRGEN CALLSEN.

Witnesses:
OTTO KÖNIG,
EMIL BLOMBERG.